Sept. 13, 1949.    F. B. HEADLEY    2,482,000
IMPULSE GENERATOR
Filed Dec. 13, 1948

Inventor:
Francis B. Headley,
by Ernest C. Britton
His Attorney.

Patented Sept. 13, 1949

2,482,000

UNITED STATES PATENT OFFICE 2,482,000

IMPULSE GENERATOR

Francis B. Headley, Pittsfield, Mass., assignor to General Electric Company, a corporation of New York Application December 13, 1948, Serial No. 65,047

9 Claims. (Cl. 171—97)

This invention relates to impulse generators of the Marx type and more particularly to an improved means for tripping or discharging such generators.

One device used to produce high voltages is a Marx impulse generator which provides for the parallel charging of a plurality of capacitor units and the discharging of the capacitors in series, parallel, or series-parallel combinations. Thus, if a voltage, V, is originally placed upon each capacitor unit and there are N capacitor units connected in parallel, when the capacitors are discharged in series, the surge voltage will be approximately NV, or the product of the number of capacitors times the voltage charge on each of the capacitor units. One of the difficulties that has always been associated with impulse generators of this type has been the inability to obtain a simple, constant and reliable means which will initiate the discharge of the capacitor units and which will function over wide ranges in charging voltage and for either polarity of the charging source, and that will not have appreciable influence on the magnitude of the surge voltage nor its wave shape.

It is an object of this invention to provide a new and simple tripping means for initiating a discharge of an impulse generator.

Still another object of this invention is to provide a new and improved impulse generator tripping device whose operation is simple, constant, and reliable over wide ranges in the charging voltage applied to the impulse generator.

And still another object of this invention is to provide a tripping device for an impulse generator such that the polarity of the charging source will have no effect upon the operation of the tripping unit.

It is still another object of this invention to provide a tripping device which will allow the tripping gaps to be properly adjusted simultaneously with the main generator gaps by simple mechanical coupling.

It is still another object of this invention to provide a tripping device that will not have appreciable influence on the magnitude of the surge voltage nor of its wave shape.

This invention will be better understood from the following description taken in connection with the accompanying drawing and its scope will be pointed out in the appended claims.

Figure 1:
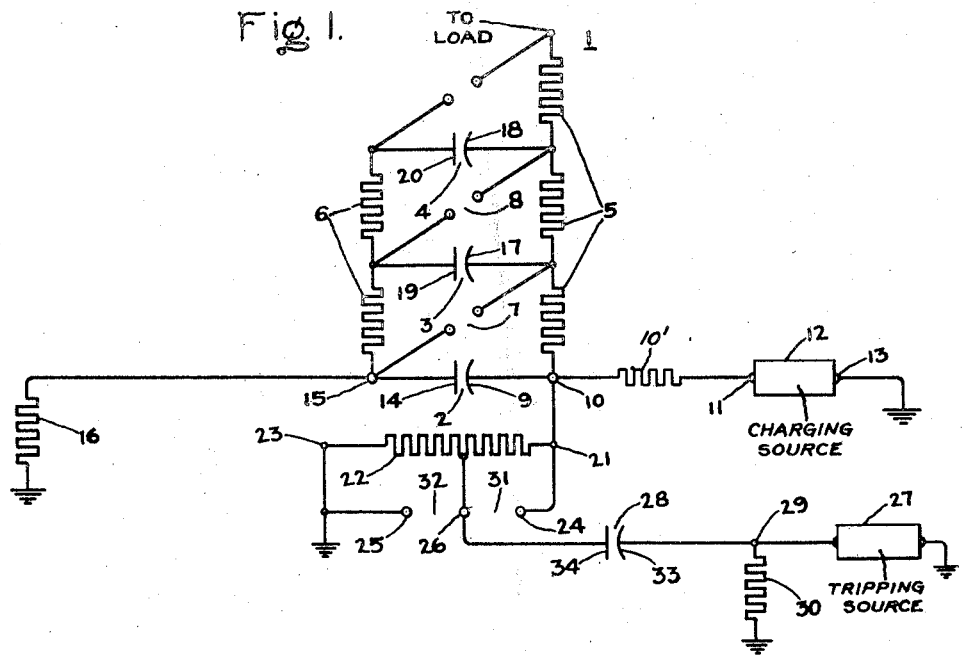
Figure 2:
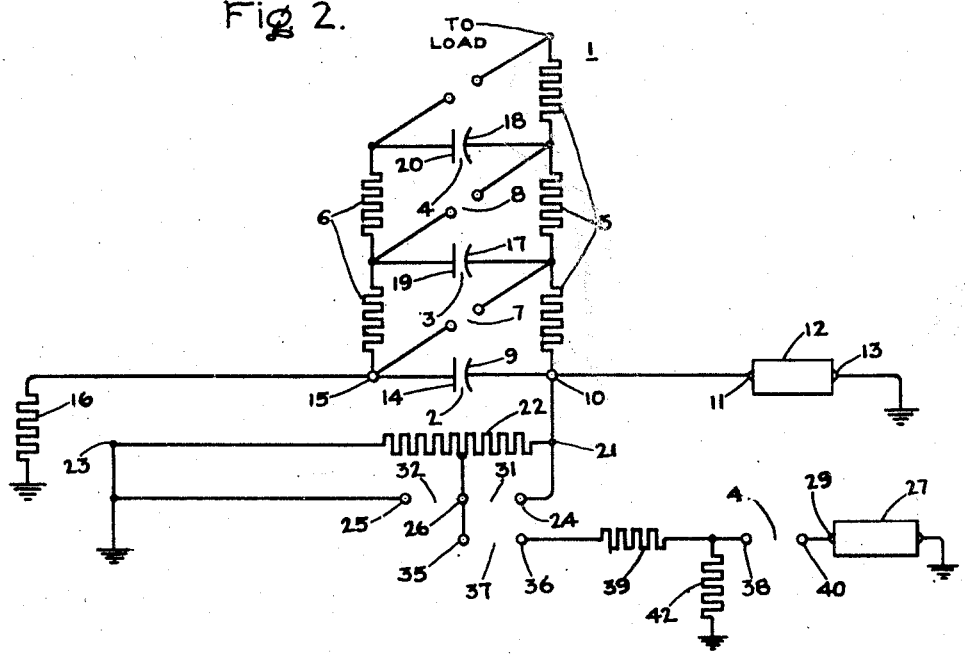

In the drawing, Fig. 1 is a schematic circuit diagram of a portion of an impulse generator of the Marx type and illustrating an embodiment of this invention as a means for initiating the operation of the circuit. Fig. 2 is a schematic circuit diagram illustrating a modified construction of the present invention.

Referring now to the drawing, there is shown therein, by way of example, a portion of an impulse generator 1 of the Marx type having a plurality of capacitor units 2, 3, and 4 connected in parallel by the resistance elements 5 and 6. Serially connecting the capacitors 2, 3 and 4 together are the electrode gaps 7 and 8. A plate 9 of capacitor unit 2 is connected thru an input terminal 10 and a resistance 10' to a terminal 11 of the charging source 12 whose other terminal 13 is grounded. The other plate 14 of the capacitor 2 is connected to the other input terminal 15 which is grounded through the resistance 16. Thus, it can be seen that as a charge is placed on the capacitors the plates 9, 17 and 18 of the capacitors 2, 3 and 4, which are connected to the charging source 12 through the resistances 5 and 10' and the input terminal 10, are charged to a potential either plus or minus V depending on the charging source polarity, whereas the other plates 14, 19 and 20 of the capacitors 2, 3 and 4 are grounded thru resistances 6 and 16. It is also obvious that the potential across the electrode gaps 7 and 8 is now V, or the charging voltage, since gap 7 is connected across plate 14 of capacitor 2 which is at ground potential and plate 17 of capacitor 3 which is at a potential of ±V, and gap 8 is connected across plate 19 of capacitor 3 which is at ground potential and plate 18 of capacitor 4 which is at a potential of ±V. These gaps are so adjusted spacially that breakdown will not occur at a voltage V, but at a voltage somewhat above that of the charging voltage.

Assume that the plates 9, 17 and 18 of the capacitors 2, 3, and 4 are at a potential of minus V. Therefore, if the plate 9, which is at a voltage of minus V, is grounded at the input terminal 10 the plate 9 will now be at ground potential and, instantaneously, the plate 14 of the capacitor 2 will assume a potential of plus V with respect to ground. The potential acting across the gap 7 will now be approximately 2V, or twice the charging potential, since plate 14 is at a potential of +V and plate 17 at a potential of −V. Therefore, the gap 7 breaks down. When this happens the plate 17 of the capacitor 3, which was at a potential of minus V, achieves the potential of plus V, and the other plate 19 of the capacitor 3, which had been at zero potential with respect to ground, achieves the potential level of approximately plus 2V. The voltage across the gap 8 approaches, therefore, three times the charging potential and the gap breaks down. It can be seen that this successive breakdown of the gaps 7 and 8 effectively places the capacitor units 2, 3 and 4 in series and causes the output voltage to be the sum of the potentials across each of the capacitors.

A reliable, simple, inexpensive and convenient means is desired to initiate the serial connection of the capacitor units 2, 3 and 4 by grounding the originally ungrounded plate, plate 9, of the first capacitor in the series, capacitor 2; that is, by grounding point 10. Shown connected to point 10 is one end, 21, of a tapped resistor 22 whose other end, 23, is connected to ground. Also connected to point 10 is an electrode 24, and to the grounded end 23 of resistor 22, or to ground, another electrode 25 is conductively fastened. Interposed within the gap formed between electrodes 24 and 25 is a third electrode 26 which is fastened to a tap on the resistor 22. Electrically connected to the electrode 26 is a tripping unit 27, which serves as the source of the tripping potential, and serially interposed between the electrode 26 and the tripping unit 27 may be a capacitor 28. The device 27 may be any suitable source of high voltage potential. The terminal 29 of the tripping unit 27, which is connected to the capacitor 28, is grounded through a resistance which may be an integral part of unit 27, but for purposes of illustration is shown as resistor 30.

It will, of course, be understood that grounding in the sense of making connection to earth is not essential and that all that grounding as here used means is that all points which are said to be grounded are connected together.

The operation of the tripping device is as follows: We have assumed that originally point 10 is at a potential of minus V. Assume also that electrode 26 is connected to the resistance midpoint of resistor 22; that the gaps 31 and 32 formed by the electrodes 24 and 26, and 26 and 25 respectively, are of such a size that breakdown of the gaps will not occur when the potential across them is equal to ½ of V, but breakdown will occur at somewhat above this value, but at less than V. The values chosen here are arbitrary and are selected only to illustrate the operation of the present invention. The plate 33 of the capacitor 28 is originally at ground potential and the other plate 34 of the capacitor 28 is at a potential of minus ½V with respect to ground, since the electrode 26 is connected to the center tap of the potentiometer 22 and the total potential difference between the ends of the potentiometer 22 is the charging voltage V. If the tripping unit 27 instantaneously places a charge of (for purposes of illustration) minus ½V on plate 33, plate 34 will assume a potential of minus V with respect to ground. Thus, the electrode 26 will also be at a potential level of minus V. The potential difference across the gap 31 is zero, since the electrode 24 is also at a potential of minus V, but the potential across the gap 32 is now equal to V since the electrode 25 is grounded. Therefore, an arc occurs across the gap 32. When this happens, electrode 26 achieves ground potential and the potential difference between electrodes 26 and 24 becomes equal to the charging voltage, V, and an arc occurs across the gap 31. This effectively grounds the electrode 24 and in so doing, causes the point 10 to be grounded. When the point 10 is grounded, a serial discharge of the capacitor units takes place as has been previously described.

It is important to note that it makes no difference whether the tripping unit 27 charges the capacitor plate 33 negatively or positively, for if it is charged to a potential of plus ½V with respect to ground, plate 34 achieves ground potential as does electrode 26. Thus, the potential difference between electrode 26 and 24 is again the charging voltage V and the gap 31 breaks down. When this occurs, the potential difference between the electrodes 26 and 25 becomes the charging voltage, V, and the gap 32 breaks down causing point 20 to be grounded and initiating the serial discharge of the capacitor units. It therefore follows from the above that the operation of the tripping circuit is independent of the charging polarity of impulse generator.

The modified tripping circuit illustrated in Fig. 2 initiates the serial discharge of the capacitor units of the impulse generator 1 in much the same manner as the circuit shown in Fig. 1. But in Fig. 2 the capacitor 28 is eliminated and connected to the electrode 26 is another electrode 35 which is separated from the electrode 36 by the gap 37. Electrode 36 is connected to electrode 38 through the current limiting resistor 39 and electrode 38 is separated from electrode 40, which is connected to terminal 29 of the tripping unit 27, by the gap 41. The electrode 38 is grounded through the resistor 42. Electrodes 38 and 40, and gap 41, are not necessarily required, depending upon the type of tripping unit. If not required, terminal 29 connects directly to the conductor at point 38.

In explaining the operation of the tripping circuit shown in Fig. 2, the following assumptions are made: Point 10 is at a potential of minus V (it does not matter whether it is plus or minus V and we have arbitrarily chosen the value of minus V); electrode 26 is connected to the resistance midpoint of resistor 22; the gaps 31, 32 and 37 are of such a size that breakdown of the gaps will not occur when the potential across them is equal to ½ of V, but breakdown will occur at somewhat above this value but at less than V; gap 41 will break down at a potential below the output voltage of tripping unit 27.

Electrodes 36 and 38 are originally at ground potential and electrode 35 is at the same potential as electrode 26 which is minus ½V with respect to ground since electrode 26 is connected to the center tap of the potentiometer 22 and the total potential difference between the ends of the potentiometer 22 is the charging voltage V. If the tripping unit 27 instantaneously places a potential of (for purposes of illustration) plus ½V on electrode 40 the gap 41 will break down since electrode 38 is originally at ground potential. Electrode 36, since it is connected to electrode 38 through the current limiting resistor 39, also achieves a potential of plus ½V. Since a potential of minus ½V with respect to ground already exists on electrode 35, a potential difference of V is obtained across gap 37 and it breaks down. Resistor 39 is small in value compared with resistor 22. Therefore, electrode 26 becomes approximately +½V in potential. Since electrode 24 is at a potential of −V, the potential difference across gap 31 is approximately 1½V, and it breaks down. When this happens, the action of the tripping circuit continues as explained for Fig. 1. It can be seen that the combination of the electrodes 35 and 36 acts in very much the same manner as the capacitor 28 shown in Fig. 1, except that unless the output voltage from tripping unit 27 that builds up on terminal 36 is appreciably larger than V, the polarity of part 28 of tripping unit, part 27, must be opposite to the charging polarity from the charging source, part 12. For example, if the tripping voltage from part 27 that is applied to terminal, part 36, is −V, the same as the charging voltage from the charging source, part 12, applied to terminal 10, it is obvious that terminal 35 before sparkover will be at −½V as already pointed out. Then since terminal 36 is now at −V, the potential difference across gap 37 is only ½V and the gap 37 will not spark over because it is set for the slightly larger voltage.

While there have been shown and described particular embodiments of this invention it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination: a storage capacitor having a first plate charged to a potential $V_1$ and a second plate charged to a potential $V_2$ different from $V_1$; a circuit for effecting the discharge of said capacitor including a resistor having one terminal connected to said second plate of said capacitor and the other terminal maintained at a potential equal to the potential $V_1$ of said first plate of said capacitor, a pair of spaced electrodes, said first mentioned terminal having one of said electrodes connected thereto, the other of said electrodes having a potential equal to the potential $V_1$ of said first plate of said capacitor, at least one additional electrode connected to said resistor, said additional electrode located electrically between and spaced from said pair of electrodes, a source of potential connected to said additional electrode through at least one capacitor unit, said source of potential providing an additional potential to said additional electrode.

2. In combination: a storage capacitor having a first plate at a potential equal to the potential of ground and a second plate charged to a potential V different from the potential of ground; a circuit for effecting the discharge of said capacitor including, a resistor having one terminal connected to said second plate of said capacitor and the other terminal connected to ground, a pair of spaced electrodes, said first mentioned terminal having one of said electrodes connected thereto, the other of said electrodes having a potential equal to the potential of ground, at least one additional electrode connected to said resistor, said additional electrode located electrically between and spaced from said pair of electrodes, a source of potential connected to said additional electrode through at least one capacitor unit, said source of potential providing an additional potential to said additional electrode.

3. In combination: a storage capacitor having a first plate at a potential equal to the potential of ground and a second plate charged to a potential V different from the potential of ground; a circuit for effecting the discharge of said capacitor including, a resistor having one terminal connected to said second plate of said capacitor and the other terminal connected to ground, a pair of spaced electrodes, said first mentioned terminal having one of said electrodes connected thereto, the other of said electrodes having a potential equal to the potential of ground, at least one additional electrode connected to said resistor, said additional electrode located electrically between and spaced from said pair of electrodes, a tripping unit serially connected to said additional electrode through at least one capacitor unit, said capacitor unit having one electrode connected to said additional electrode and another electrode connected to said tripping unit, said last mentioned electrode conductively connected to ground through a resistor.

4. In combination: a storage capacitor having a first plate at a potential equal to the potential of ground and a second plate charged to a potential V different from the potential of ground; a circuit for effecting the discharge of said capacitor including, a resistor having one terminal connected to said second plate of said capacitor and the other terminal connected to ground, a pair of spaced electrodes, said first mentioned terminal having one of said electrodes connected thereto, the other of said electrodes having a potential equal to the potential of ground, at least one additional electrode connected to said resistor, said additional electrode located electrically between and spaced from said pair of electrodes, a tripping unit, at least two pairs of spaced electrodes, said additional electrode having one electrode of the first of said pairs of electrodes connected thereto, the other electrode of said first pair and an electrode of the second of said pairs connected together and connected to ground through a resistor, said tripping unit having the other electrode of said second pair connected thereto.

5. In combination: a high voltage impulse generator of the Marx type having an input charging terminal and a source of charging potential connected to said input terminal, said generator having an output charging terminal connected to ground through a resistance or other suitable impedance; a circuit for initiating the discharge of said generator including, a resistor having one terminal connected to said input charging terminal and the other terminal connected to ground, a pair of spaced electrodes, one of said electrodes connected to said input charging terminal and the other of said electrodes connected to ground, at least one additional electrode connected to said resistor, said additional electrode located electrically between and spaced from said pair of electrodes, a source of potential connected to said additional electrode through at least one capacitor unit, said source of potential providing an additional potential to said additional electrode.

6. In combination: a high voltage impulse generator of the Marx type having an input charging terminal and a source of charging potential connected to said input terminal, said generator having an output charging terminal connected to ground through a resistance or other suitable impedance; a circuit for initiating the discharge of said generator including a resistor having one terminal connected to said input charging terminal and the other terminal connected to ground, a pair of spaced electrodes, one of said electrodes connected to said input charging terminal and the other of said electrodes connected to ground, at least one additional electrode connected to said resistor, said additional electrode located electrically between and spaced from said pair of electrodes, a tripping unit serially connected to said additional electrode through a capacitor unit, said capacitor unit having one electrode connected to said additional electrode and another electrode connected to said tripping unit, said last mentioned electrode conductively connected to ground through a resistor.

7. In combination: a high voltage impulse generator of the Marx type having an input charging terminal and a source of charging potential connected to said input terminal, said generator having an output charging terminal connected to ground through a resistor; a circuit for initiating the discharge of said generator including, a resistor having one terminal connected to said input terminal and the other terminal connected to ground, a pair of spaced electrodes, one of said electrodes connected to said input terminal and the other of said electrodes connected to ground, at least one additional electrode connected to said resistor, said additional electrode located electrically between and spaced from said pair of electrodes, a tripping unit, at least two pairs of spaced electrodes, said additional electrode having one electrode of the first of said pairs of electrodes connected thereto, the other electrode of said first pair and an electrode of the second of said pairs connected together and connected to ground through a resistor, said tripping unit having the other electrode of said second pair connected thereto.

8. In combination: a high voltage impulse generator of the Marx type having an input charging terminal and a source of charging potential connected to said input terminal, said generator having an output charging terminal connected to ground through a resistor; a circuit for initiating the discharge of said generator including; a resistor having one terminal connected to said input terminal and the other terminal connected to ground, a pair of spaced electrodes, one of said electrodes connected to said input terminal and the other of said electrodes connected to ground, at least one additional electrode connected to the midpoint of said resistor, said additional electrode located electrically between and spaced approximately equally from said pair of electrodes such that electrical conduction will occur between said additional electrode and said pair of electrodes when the potential between said additional electrode and at least one electrode of said pair of electrodes is somewhat greater than one-half the potential of said charging source, a tripping unit serially connected to said additional electrode through a capacitor unit, said capacitor unit having one electrode connected to said additional electrode and another electrode connected to said tripping unit, said last mentioned electrode conductively connected to ground through a resistor, said tripping unit providing an additional potential to said additional electrode.

9. In combination: a high voltage impulse generator of the Marx type having an input charging terminal and a source of charging potential connected to said input terminal, said generator having an output charging terminal connected to ground through a resistor; a circuit for initiating the discharge of said generator including: a resistor having one terminal connected to said input terminal and the other terminal connected to ground, a pair of spaced electrodes, one of said electrodes connected to said input terminal and the other of said electrodes connected to ground, at least one additional electrode connected to the midpoint of said resistor, said additional electrode located electrically between and spaced approximately equally from said pair of electrodes such that electrical conduction will occur between said additional electrode and said pair of electrodes when the potential between said additional electrode and at least one electrode of said pair of electrodes is appreciably greater than one-half the potential of said charging source, a tripping unit, at least two pairs of spaced electrodes, said additional electrode having one electrode of the first of said pairs of electrodes connected thereto, the other electrode of said first pair and an electrode of the second of said pairs connected together and connected to ground through a resistor, said tripping unit having the other electrode of said second pair connected thereto, said tripping unit providing an additional potential to said additional electrode, and the polarity of this tripping unit output potential being opposite to the input potential of the charging source.

FRANCIS B. HEADLEY.

No references cited.